March 22, 1960 W. D. KOHLINS 2,929,531
SEAL FOR PRESSURE VESSEL DOORS
Filed April 28, 1958
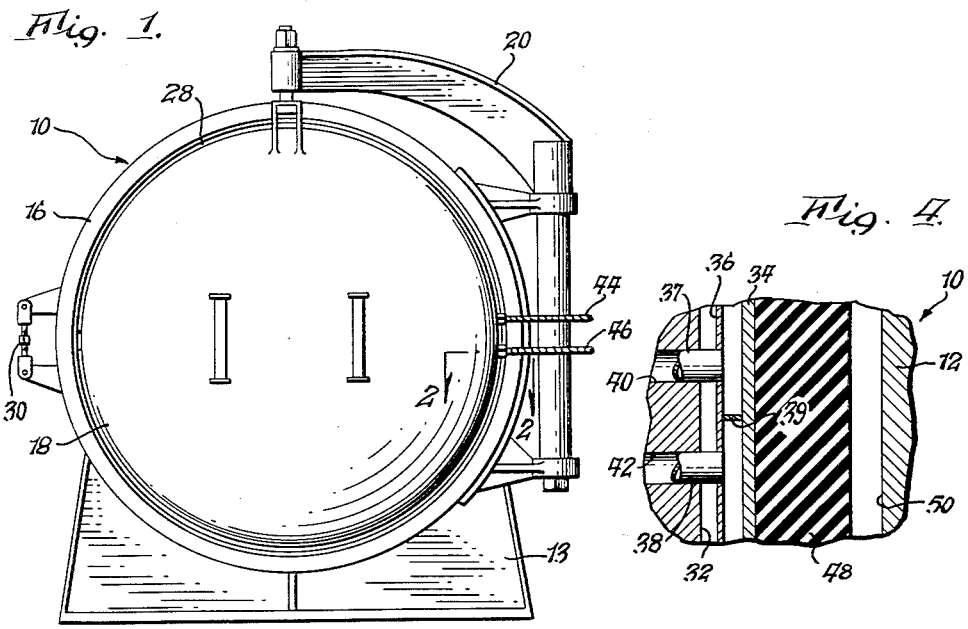
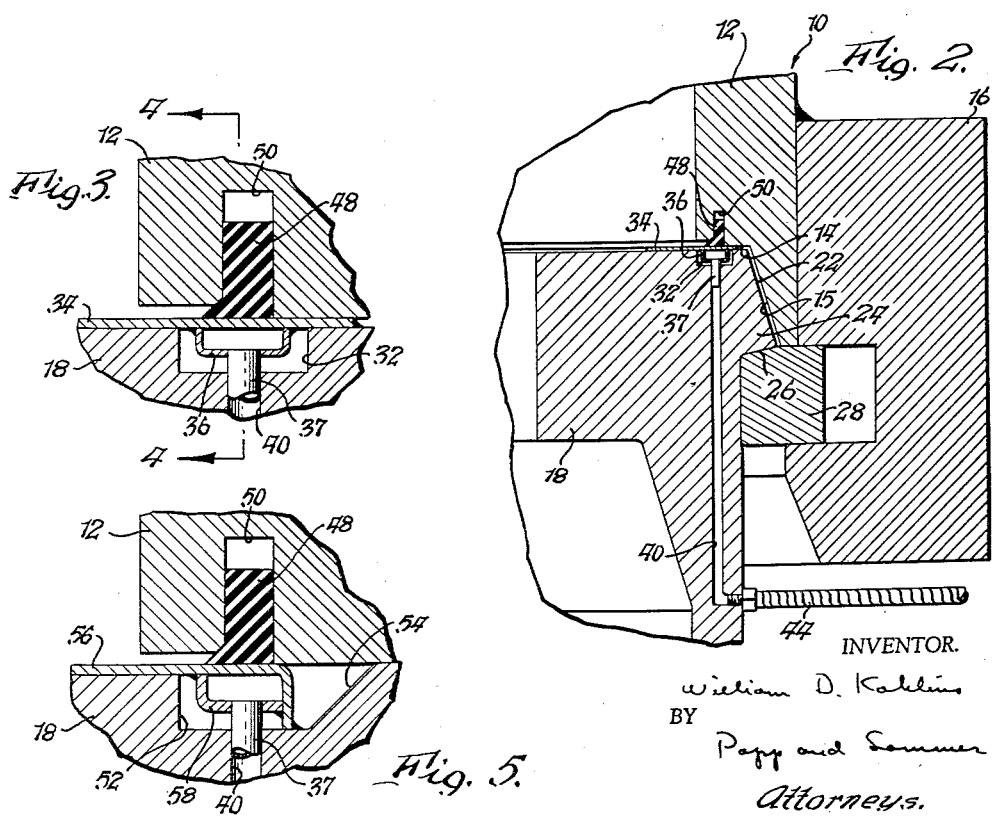
INVENTOR.
William D. Kohlins
BY
Popp and Sommer
Attorneys.

United States Patent Office 2,929,531
Patented Mar. 22, 1960

2,929,531

SEAL FOR PRESSURE VESSEL DOORS

William D. Kohlins, Eggertsville, N.Y., assignor to Blaw-Knox Company, Pittsburgh, Pa., a corporation of Delaware Application April 28, 1958, Serial No. 731,256

5 Claims. (Cl. 220—46)

This invention relates to a seal for pressure vessel doors used on autoclaves for batch processing of materials.

In certain industries, such as in the chemical, glass and rubber industries, pressure vessels and curing chambers require trouble-free, quick opening doors for optimum processing operations. In one type of door designed for such use, a sealing gasket is used to provide an air tight seal between the door and the door frame of the pressure vessel, which door has given excellent results and has been favorably received by industry.

The present invention, which represents an improvement in such type of door, provides a means for cooling a seating surface for the sealing gasket during operation of the pressure vessel. As a result, the seating surface of the gasket is protected against galling, cracking and other forms of thermal breakdown.

The object of this invention is to provide an improved type of sealing arrangement for use on a pressure vessel door.

A more specific object is to provide a means for cooling a seating surface of a pressure vessel door to protect the vessel gasket against galling, cracking and other types of thermal breakdown.

These and further objects and features of the invention will become apparent from the following description and accompanying drawing wherein:

Fig. 1 is an end view of a pressure vessel having a door incorporating the principles of the sealing arrangement of the invention;

Fig. 2 is an enlarged section view as seen from line 2—2 in Fig. 1;

Fig. 3 is an enlarged view of a portion of Fig. 2;

Fig. 4 is a section view as seen from line 4—4 in Fig. 3; and

Fig. 5 is similar to Fig. 3 but showing a modified sealing arrangement.

Referring now to the drawing, the numeral 10 identifies a pressure vessel or curing chamber comprising a cylinder 12 mounted upon a base 13, one end of the cylinder being closed, the other end being open to provide a door frame 14 having a bevel 15, and a flange 16 surrounding the door frame. A door 18, supported by a davit type hinge 20, is adapted to seat within the door frame 14, said door having a bevel 22 which meets the bevel 15 of the door frame. The door bevel 22 is formed on a flange 24 extending about the periphery of the door, which flange has a slightly tapered surface 26 adapted to be engaged by a split ring 28. Ring expanding means in the form of a hydraulic cylinder or a hand-operated jack 30, is adapted for expanding the split ring 28 whereby the door tapered surface 26 will be clear of engagement with the split ring so that the door may be opened. In closed position of the door, it will be seen that the door will be urged in sealing engagement with the split ring by pressure within the cylinder 12, hence, the greater the pressure, the tighter the seal.

A channel or recess 32 is formed in the inner surface of the door, which recess extends about the circumference of the door, and is covered by a plate 34. Within the recess 32 and affixed to the back of the plate 34, is a U-shaped channel member 36, as best seen in Fig. 3. A pair of pipes or conduits 37 and 38 are arranged with one end of each opening into the channel member 36 on opposite sides of a dividing wall 39, the other end of each being arranged in passageways 40 and 42 respectively formed in the door 18. Hose means 44 and 46 connect with the other end of passageways 40 and 42 respectively. By means of such an arrangement cooling liquid from hose 44 can flow into passageway 40, pipe 37, and enter the channel member 36, pass around therein and exit into pipe 38, passageway 42 and into hose 46. In such manner the plate 34 may be cooled when the pressure vessel is operating under high temperature.

A gasket 48, which may be formed of rubber, is arranged in a groove or recess 50, extending about the end of the cylinder 12 within the door frame 14. The gasket is arranged to be engaged by the plate 34 when the door is closed. Since the plate may be maintained in cooled condition, the surface of the gasket will not be harmed by high temperature conditions within the pressure vessel 10.

A modified form of sealing arrangement is shown in Fig. 5, which includes a recess 52 formed in the inner surface of the door 18 and about the circumference of the door, which recess 52 has a tapered side 54 and is formed to receive an L-shaped cooling plate 56 and an L-shaped channel member 58 which is affixed in liquid tight manner to the cooling plate. A dividing wall (not shown) similar to dividing wall 39 of the first described embodiment, is arranged within the channel member 58, and a pair of pipes or conduits 37 and 38 are arranged to open into the channel member 58, on either side of the dividing wall thereof, the other end of each conduit being arranged in passageways 40 and 42 respectively. Hose means 44 and 46 connect with the other end of passageways 40 and 42 respectively, so that cooling liquid may be circulated through the channel member 58, to cool the plate 56.

From the foregoing it will be seen that the sealing arrangement of the invention will protect the gasket of the pressure vessel against galling, cracking and other types of thermal breakdown.

While the invention has been described for use in pressure vessels wherein high temperatures and pressures may be realized, it will be apparent that the principles of the invention may be effectively applied for door sealing purposes on sub-atmospheric pressure, or vacuum vessels, wherein freezing temperatures may be used. In the latter case, a heating medium could be utilized for keeping the gasket warm, or at a desired temperature, so as to avoid deterioration resulting from extremely low temperatures.

It will be seen that both forms of the invention have a tube arranged in spaced relation to the sides and bottom of its channel, and supported by two longitudinal fins which are secured along their outer edges to the door or frame member which is channelled around the door opening to so receive the tube. Since the tube comes into direct parting contact with the gasket, it will be seen that this thermally isolates the tube from the channelled door or frame member so as to make it essentially effective in cooling the parting face of the gasket from the heat exchange medium flowing through the tube.

The foregoing description has been given in detail without thought of limitation since the inventive principles involved are capable of assuming other physical embodiments without departing from the spirit of the invention and the scope of the appended claims.

What is claimed is:

1. A seal for the door member closing an opening in the door frame member of a vessel, one of which members is provided with a channel surrounding said opening and opening toward an opposing surface of the other member, comprising a tube arranged along said channel in spaced relation to the sides and bottom thereof, at least one longitudinal fin projecting laterally from said tube and connected along its outer edge to said one member along said channel therein, a gasket of resilient material in contact with and between said tube and said opposing surface of said other member, and means circulating a heat exchange medium through said tube to modify the temperature of the surface of said gasket contacting said tube.

2. A seal for the door member closing an opening in the door frame member of a vessel, one of which members provided with a channel surrounding said opening and opening toward an opposing surface of the other member, comprising a tube arranged along said channel in spaced relation to the sides and bottom thereof, a pair of longitudinal fins projecting in opposite directions from said tube across the mouth of said channel and connected at their outer ends to said one member along opposite sides of said channel therein, a gasket of resilient material in contact with and between said tube and said opposing surface of said other member, and means circulating a heat exchange medium through said tube to modify the temperature of the surface of said gasket contacting said tube.

3. A seal for the door member closing an opening in the door frame member of a vessel, one of which members is provided with a channel surrounding said opening and opening toward an opposing surface of the other member, comprising an elongated plate extending over and enclosing the mouth of said groove and connected at its opposite longitudinal edges to said one member along opposite sides of said channel therein, an elongated channel member of U-shaped form in cross section arranged longitudinally in said channel with its edges secured to the face of said first plate to provide a tube in said channel in spaced relation to the sides and bottom thereof, a gasket of resilient material in contact with and between said tube and said opposing surface of said other member, and means circulating a heat exchange medium through said tube to modify the temperature of the surface of the gasket contacting said tube.

4. A seal for the door member closing an opening in the door frame member of a vessel, one of which members is provided with a channel surrounding said opening and opening toward an opposing surface of the other member, comprising a tube arranged along said channel in spaced relation to the sides and bottom thereof, a first longitudinal fin projecting from said tube across one side of the mouth of said channel and being connected at its outer end to said one member along said one side of said channel, a second longitudinal fin projecting from said tube generally perpendicularly to said first fin toward the bottom of said channel and being connected to said bottom of said channel, a gasket of resilient material in contact with and between said tube and said opposing surface of said other member, and means circulating a heat exchange medium through said tube to modify the temperature of the surface of said gasket contacting said tube.

5. A seal for the door member closing an opening in the door frame member of a vessel, one of which members is provided with a channel surrounding said opening and opening toward an opposing surface of the other member, comprising a first elongated plate of L-shaped form in cross section having one side connected along its edge to said one member along one side of the mouth of said channel therein and having its other side connected along its edge to the bottom of said channel, a second elongated plate of L-shaped form in cross section arranged within said first L-shaped plate and having one side connected along its edge to said one side of said one first L-shaped plate and having its other side connected along its edge to the other side of said first L-shaped plate thereby to provide a tube in said channel in spaced relation to the sides and bottom thereof, a gasket of resilient material in contact with and between said tube and said opposing surface of said other member, and means circulating a heat exchange medium through said tube to modify the temperature of the surface of the gasket in contact therewith.

References Cited in the file of this patent

UNITED STATES PATENTS

| | | |
|---|---|---|
| 2,420,240 | Hagerty | May 16, 1947 |
| 2,662,053 | Brown | Dec. 8, 1953 |
| 2,691,460 | Barnebey | Oct. 12, 1954 |